US006869112B2

(12) United States Patent
Guidetti

(10) Patent No.: US 6,869,112 B2
(45) Date of Patent: Mar. 22, 2005

(54) DEVICE FOR LOCKING TWO TELESCOPIC ELONGATED ELEMENTS

(76) Inventor: Pascal Guidetti, La Tour, F-38420 Revel (FR)

(*) Notice: Subject to any disclaimer, the term of this patent is extended or adjusted under 35 U.S.C. 154(b) by 0 days.

(21) Appl. No.: 10/257,666

(22) PCT Filed: Apr. 13, 2001

(86) PCT No.: PCT/FR01/01145

§ 371 (c)(1),
(2), (4) Date: Jun. 27, 2003

(87) PCT Pub. No.: WO01/79709

PCT Pub. Date: Oct. 25, 2001

(65) Prior Publication Data

US 2004/0012210 A1 Jan. 22, 2004

(30) Foreign Application Priority Data

Apr. 17, 2000 (FR) .............................................. 00 04936

(51) Int. Cl.$^7$ .................................................... F16B 7/10
(52) U.S. Cl. .................... 292/306; 292/292; 403/109.1; 280/823
(58) Field of Search ............................... 292/259 R, 292, 292/295, 305–306; 403/109.1, 109.2, 109.3, 109.5, 377; 16/66, 82, 84; 280/820, 823

(56) References Cited

U.S. PATENT DOCUMENTS

| 3,734,441 A | * | 5/1973 | Lux | 403/104 |
|---|---|---|---|---|
| 5,238,213 A | * | 8/1993 | Pool | 292/306 |
| 5,595,410 A | | 1/1997 | Wilson et al. | |
| 5,913,783 A | * | 6/1999 | Weener et al. | 52/127.2 |
| 5,928,290 A | * | 7/1999 | Gramnas | 292/306 |
| 6,176,639 B1 | * | 1/2001 | Fratini et al. | 403/104 |
| 6,179,514 B1 | * | 1/2001 | Cheng | 403/109.3 |
| 6,247,772 B1 | * | 6/2001 | Tuttle et al. | 312/317.3 |
| 6,282,841 B1 | * | 9/2001 | Santa Cruz et al. | 292/259 R |
| 6,409,412 B1 | * | 6/2002 | Huang | 403/109.3 |
| 6,619,602 B2 | * | 9/2003 | Stevenson | 248/188.8 |
| 6,626,951 B1 | * | 9/2003 | Gramnas | 292/306 |

FOREIGN PATENT DOCUMENTS

| GB | 2 247 899 | 3/1992 |
|---|---|---|
| GB | 2 258 151 | 2/1993 |

* cited by examiner

Primary Examiner—Daniel P. Stodola
Assistant Examiner—Christopher Boswell
(74) Attorney, Agent, or Firm—Young & Thompson

(57) ABSTRACT

A device for locking two elongated elements the first of which slides in the second telescopically, comprises members (12, 22) for locking the first element (2) longitudinally relative to the second element (4), a lock washer (13) arranged around the first element and whereof the circumferential part is placed between two longitudinally opposite supports of the second element and an elastic return member (18) placed between the second element and the washer and acting on the washer in a site at some distance from the supports so as to bring the lock washer in an extreme inclined position relative to the first element wherein the two opposite parts of the washer are in contact with the first element so as to lock the first element (2) relative to the second element (4) in the longitudinal direction.

9 Claims, 7 Drawing Sheets

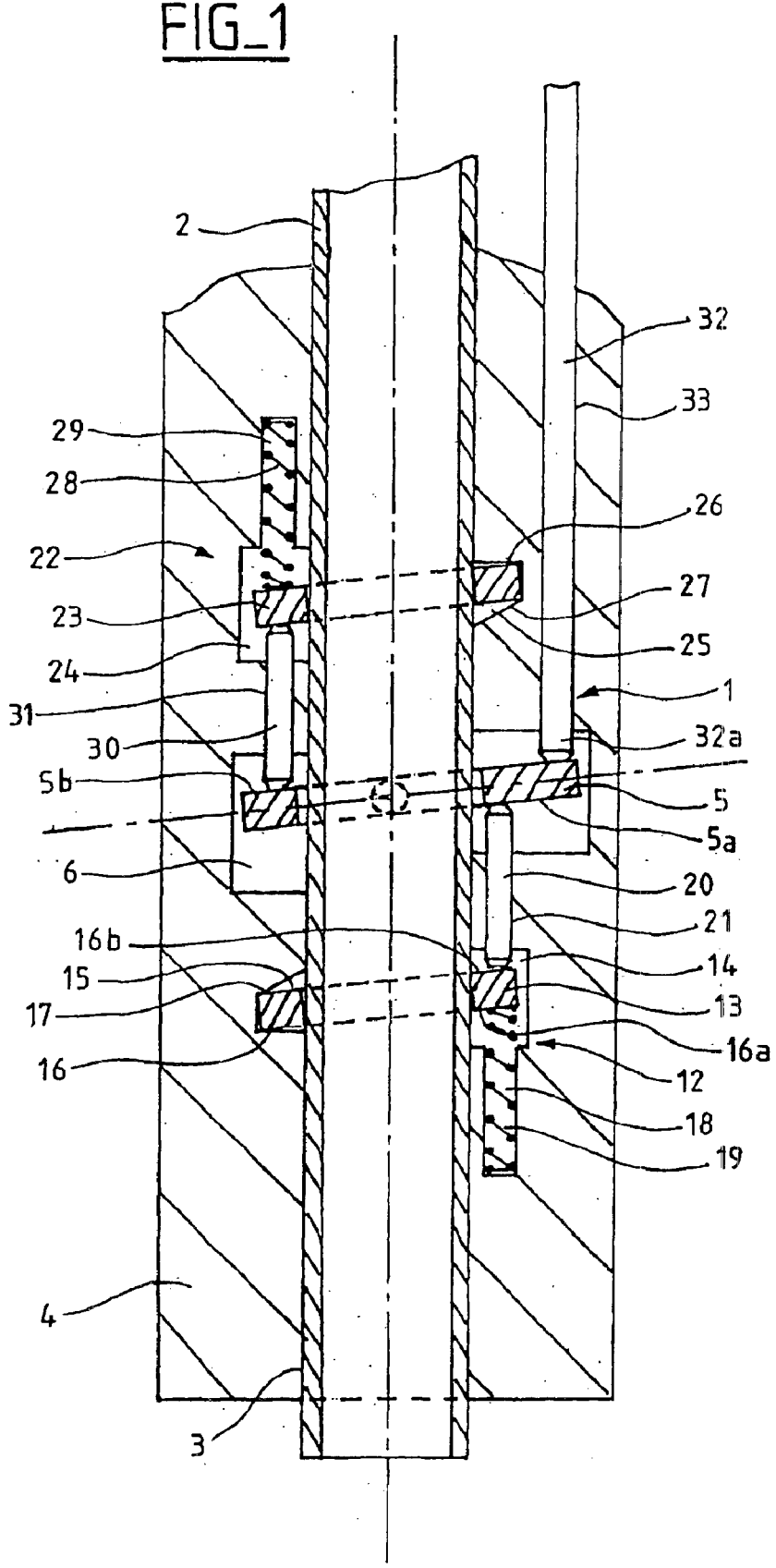
FIG_1

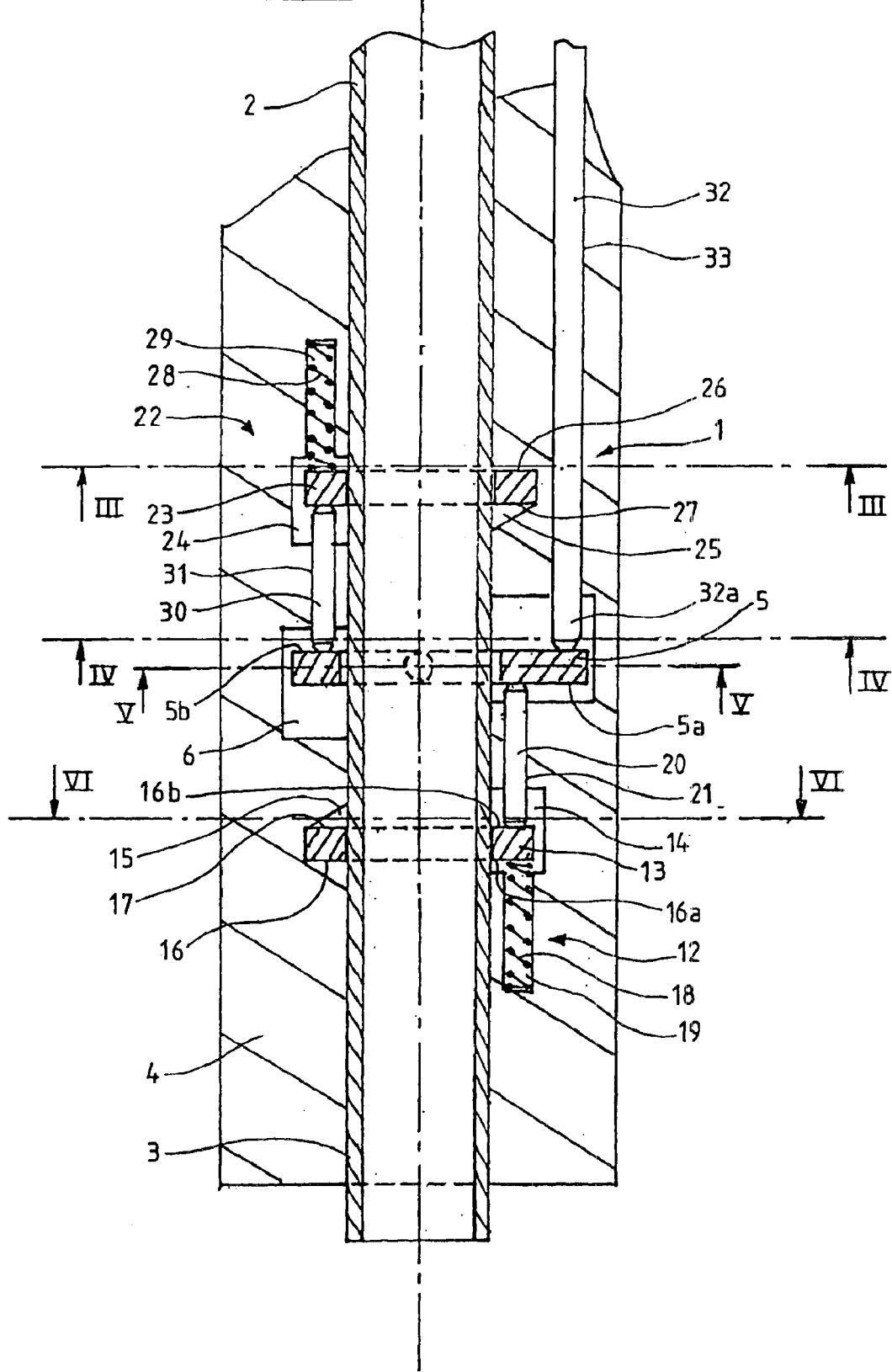

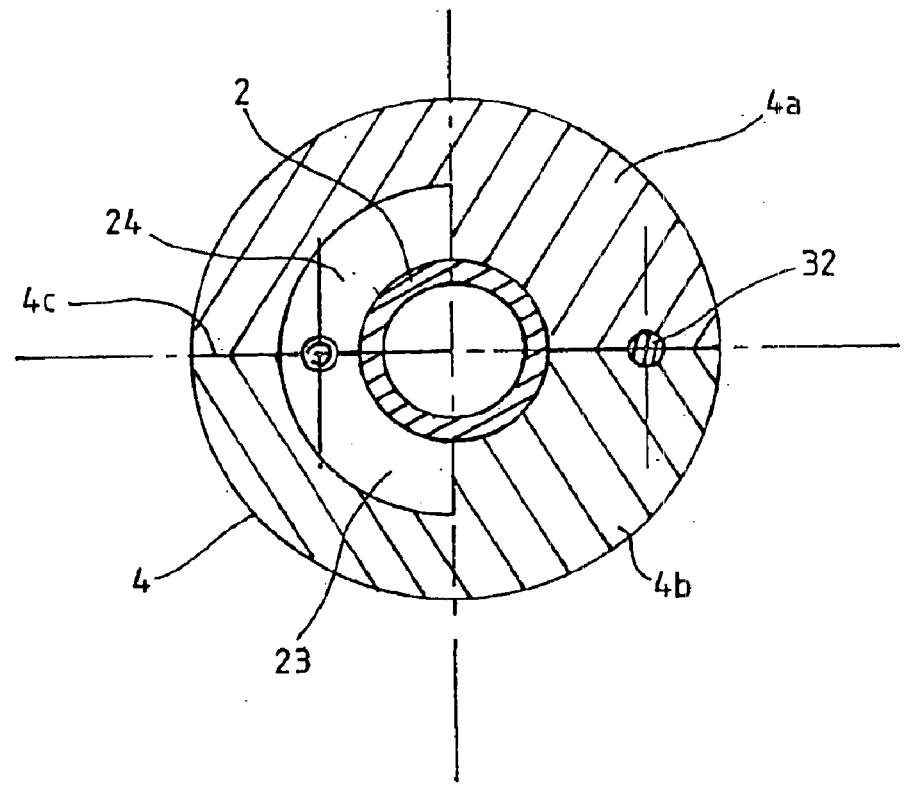
FIG_3
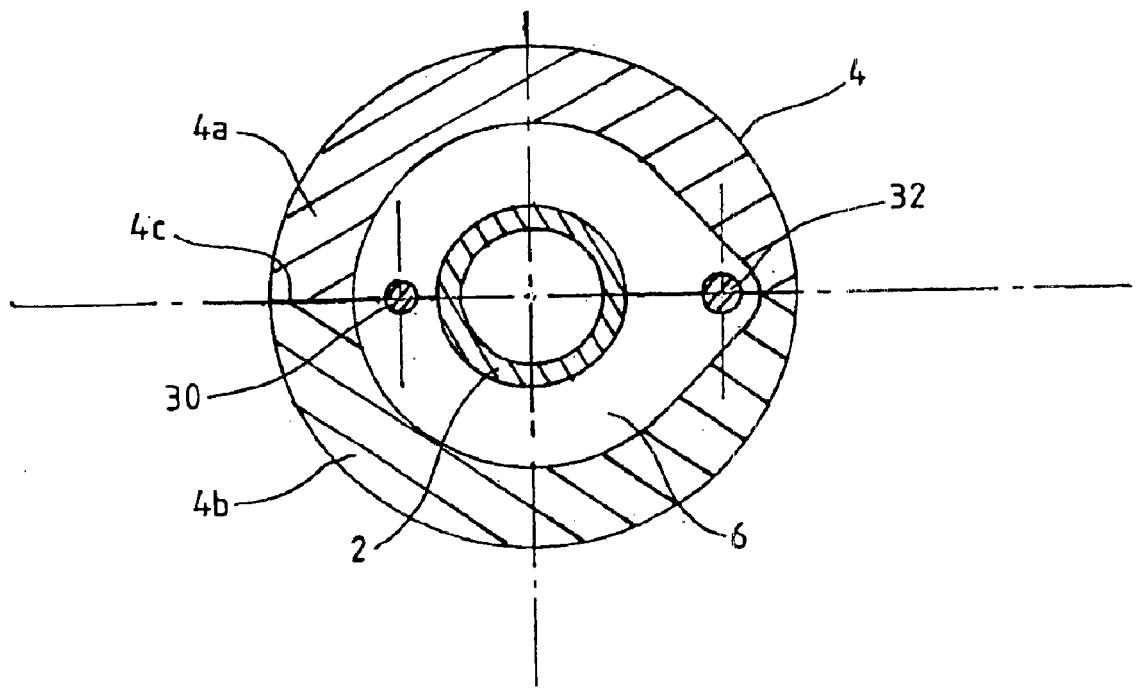
FIG_4

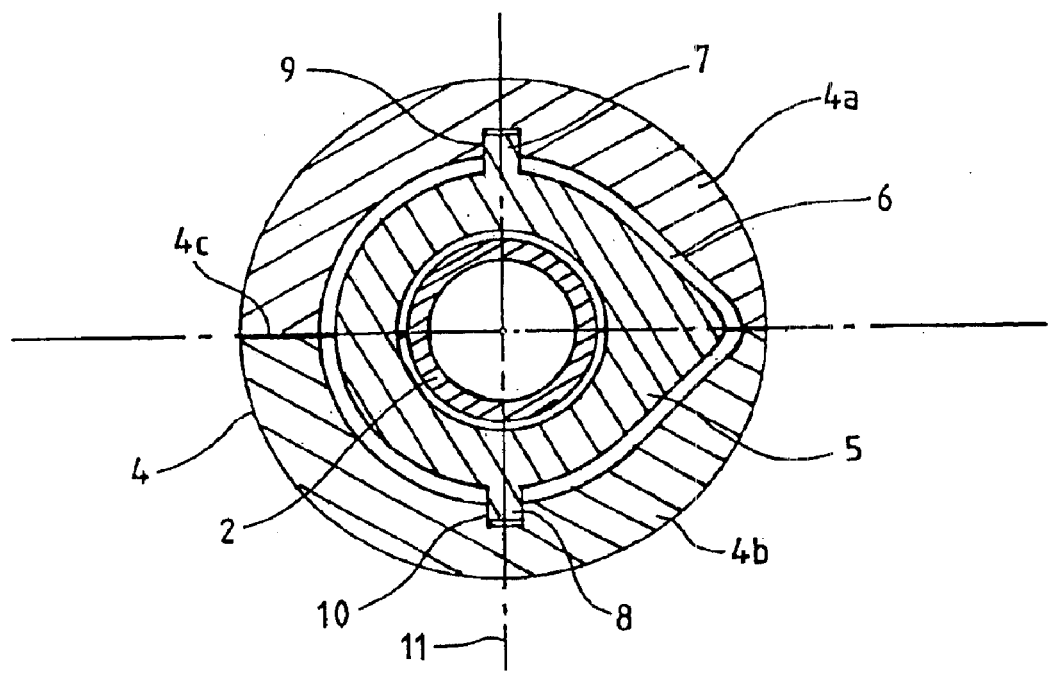
FIG_5
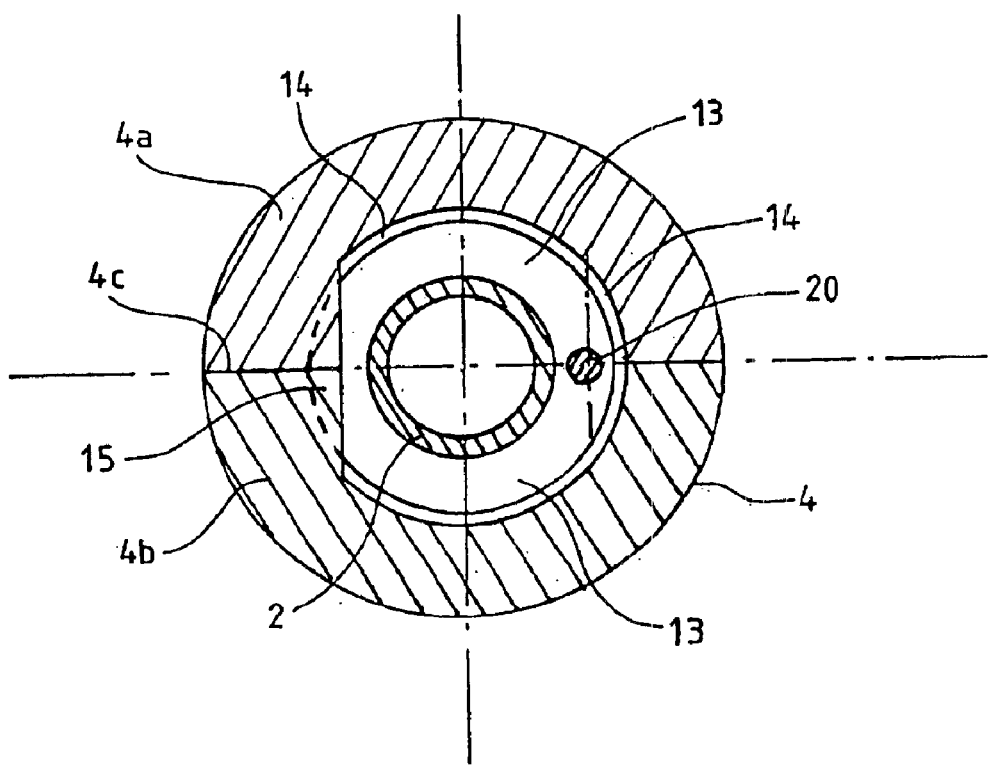
FIG_6

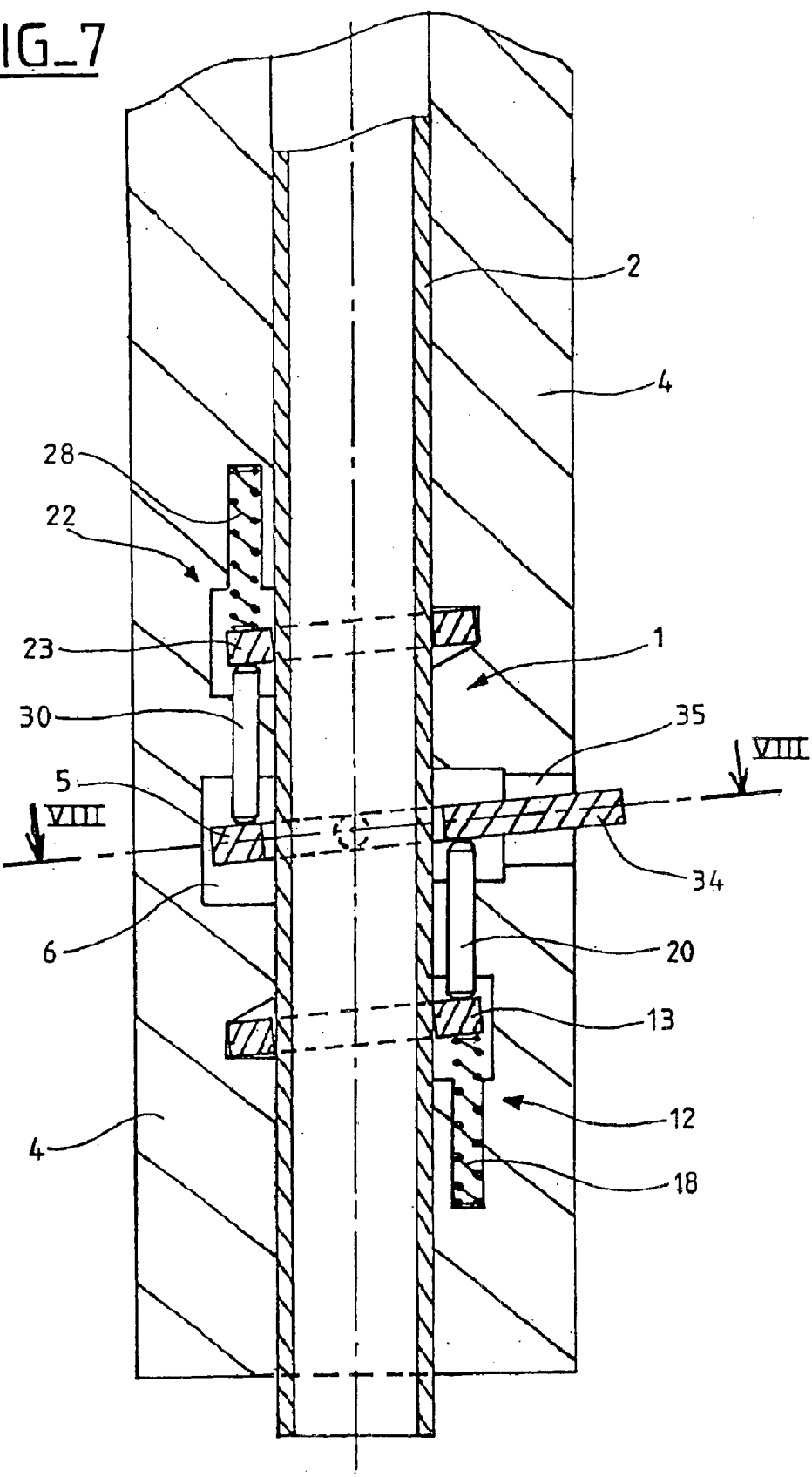
FIG_7

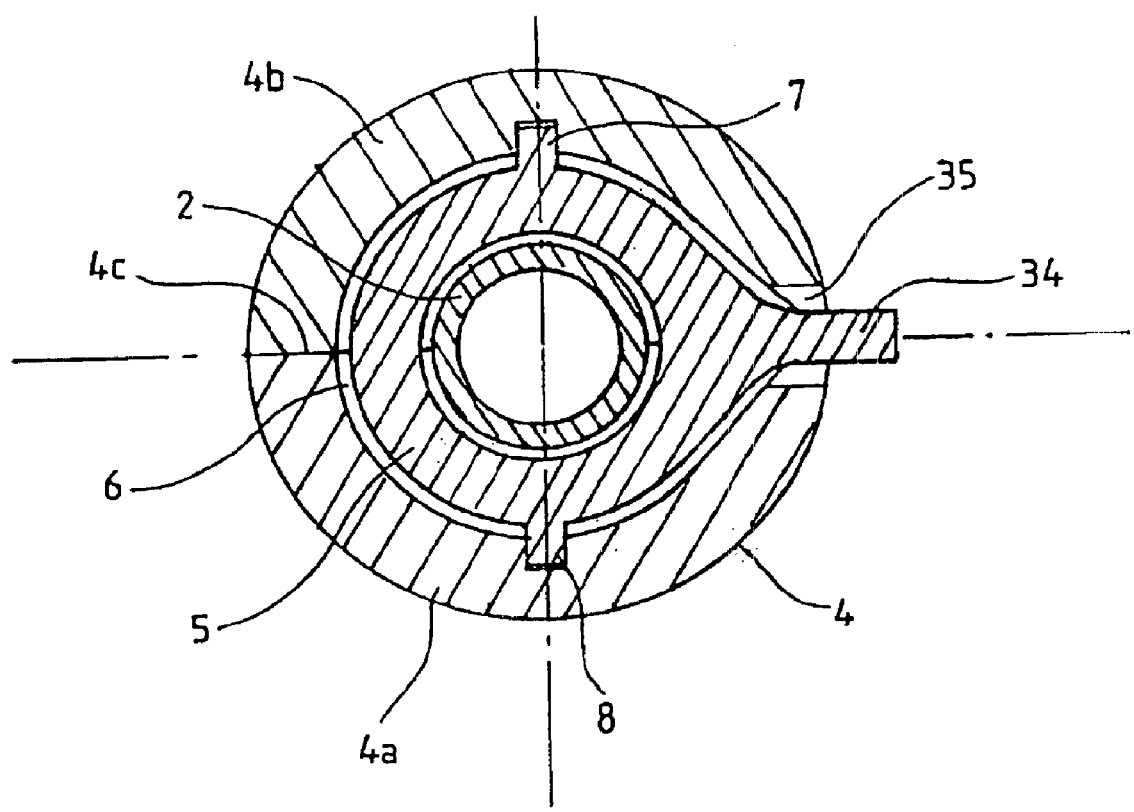
FIG_8

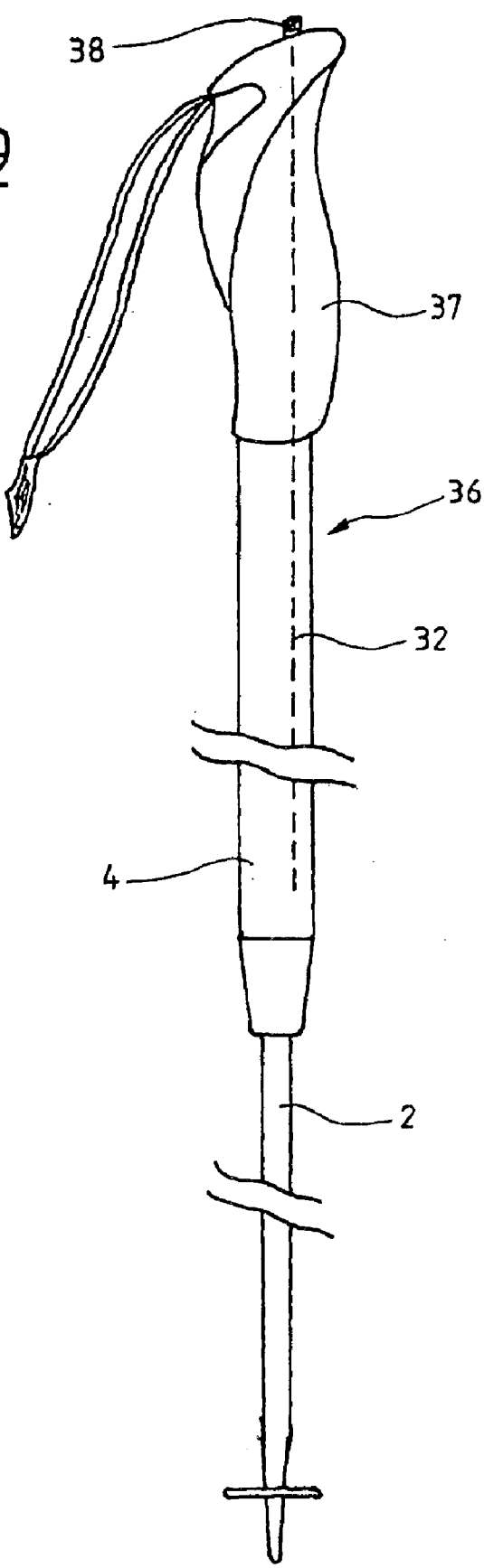
FIG_9

DEVICE FOR LOCKING TWO TELESCOPIC ELONGATED ELEMENTS

FIELD OF INVENTION

The present invention relates to a device for locking two elongate elements, a first of which slides in a second telescopically.

BACKGROUND OF THE INVENTION

To lock two telescopic elements in a given longitudinal position it is known practice for the end of the outer element to be provided with a conical ring with longitudinal slots and with a nut so as to squeeze this split ring and press it against the inner element.

Patent FR-A-2 768 200 also discloses how to immobilize two telescopic elongate elements in one direction by cutting the end of the outer element at an angle and arranging around the inner element a washer which, when it bears against the end of the chamfer, adopts an inclination and locks the inner element in the direction of pushing it into the outer element.

SUMMARY OF THE INVENTION

The object of the present invention is to propose a better device for locking two telescopic elements.

The device for locking two elongate elements, a first of which slides in a second telescopically, that is the subject of the present invention, comprises means for locking the first element in a first longitudinal direction with respect to the second element, which means comprise a washer arranged around the first element and a circumferential part of which is placed between two longitudinally opposed supports of said second element and an elastic return member placed between said second element and said washer and acting in said longitudinal direction on the washer at a point distant from said supports so as to bring the washer into an extreme inclined position with respect to the first element, in which position two opposed parts of this washer are in contact with the first element so as to lock the first element with respect to the second element in said longitudinal direction.

The locking device according to the invention also comprises a tilting member articulated to said second element, a spacing member placed between the washer and the tilting member and an operating member allowing action on the tilting member so that action on this operating member causes the tilting member to tilt, which tilting member, via the spacing member acts on the washer in such a way as to move it away from its aforementioned extreme position against the action of said return means, reducing its inclination, so as to release the first element with respect to the second element.

According to a preferred embodiment of the present invention, the locking device comprises second means for locking the first element in the other longitudinal direction with respect to the second element, which means comprise a second washer arranged around the first element and a circumferential part of which is placed between two second longitudinally opposed supports of said second element and a second elastic return member placed between said second element and said second washer and acting in said other longitudinal direction on the second washer at a point distant from said second supports so as to bring the second washer into an extreme inclined position with respect to the first element, in which position two opposed parts of this second washer are in contact with the first element so as to lock the first element with respect to the second element in said other longitudinal direction, and in that it comprises a second spacer member placed between the second washer and said tilting member so that the aforementioned action on this operating member acts also, via the second spacer member, on the second washer so as to move it away from its aforementioned extreme position against the action of said second return member, reducing its inclination, so as to release the first element with respect to the second element.

According to the invention, said first and second locking means are preferably arranged on each side of said tilting member, said tilting member acting in opposite directions on said spacer members.

According to the invention, said tilting member preferably comprises a washer which from a distance surrounds said first element and which is mounted in an articulated fashion on the second element, radially relative to the latter.

According to the invention, said washers are preferably arranged in internal annular housings of the second element.

According to the invention, said spacer members preferably comprise rods that can move longitudinally in passages of the second element.

According to the invention, said operating member preferably comprises a longitudinal rod that can move longitudinally in a passage of the second element.

According to the invention, said operating member preferably comprises an extension of said tilting member, which extends toward the outside of the second element.

According to the invention, the second element preferably comprises two assembled parts the mutual plane of contact of which extends along a longitudinal plane passing through the axis of said elements. Said return members, said spacer members and said operating member are preferably arranged between said assembled parts of the second element, and said tilting member is preferably articulated to the second element about an axis perpendicular to said plane of contact.

BRIEF DESCRIPTION OF THE DRAWINGS

The present invention will be better understood from studying a device for locking two telescopic elongate elements which is described by way of nonlimiting example and illustrated by way of a drawing in which:

FIG. 1 depicts a longitudinal section of a device for locking two telescopic elongate elements, in locked position;

FIG. 2 depicts a longitudinal section of the device of FIG. 1 in the unlocked position;

FIGS. 3, 4, 5 and 6 show radial sections on III—III, IV—IV, V—V and VI—VI of the device depicted in FIG. 2, at various points along its length;

FIG. 7 depicts a longitudinal section of an alternative form of embodiment of the aforementioned locking device;

FIG. 8 depicts a radial section on VIII—VIII of the device of FIG. 7;

and FIG. 9 depicts an application of the aforementioned locking device to a pole.

DETAILED DESCRIPTION OF THE INVENTION

Referring to FIGS. 1 to 6, it can be seen that there is depicted a device 1 for locking, in the longitudinal direction and one with respect to the other, an inner elongate element 2 sliding in a passage 3 of an outer elongate element 4, these elements 2 and 4 being cylindrical.

Referring more specifically to FIGS. 1, 2, 4 and 5, it can be seen that the locking device 1 comprises a tilting washer 5 which is arranged around and some distance from the inner element 2, in an annular internal housing 6 of the outer element 4. This ring 5 has diametrically opposed axles 7 and 8 arranged in opposed interior blind holes 9 and 10 of the outer element 4, so that the washer 5 can pivot about an axis 11 which extends radially with respect to the elements 2 and 4.

As can be seen more specifically in FIGS. 1, 2 and 6, the locking device 1 further comprises, on one side of the tilting washer 5, first locking means 12 which comprise a locking washer 13 arranged around the inner element 2 and in an internal annular housing of the outer element 4. This housing 14 has, on one side of the longitudinal plane passing through the axis 11, a central narrowing 15 which determines two longitudinally opposed supports 16 and 17 such that the locking washer 13 can pivot in such a way as to adopt positions which are inclined with respect to the axis of the elements 2 and 4.

On the other side of said longitudinal plane, and opposite the narrowing 15, the locking means 12 comprise a compression spring 18 arranged in a blind longitudinal orifice 19 which opens into the housing 14 toward the tilting washer 5. This spring 18 acts on the face 16a of the washer 13 so as to push it back toward the tilting washer 5, by pivoting between the supports 16 and 17.

The locking device 1 also comprises a longitudinal spacer rod 20 which is arranged in a longitudinal passage 21 of the outer element 4 which opens on the one hand into the housing 6 and on the other hand into the housing 14. One of the ends of this spacer rod 20 presses against the face 5a of the tilting washer 5 and its other end presses against the face 16b of the locking washer 13, on the opposite side to the spring 18.

As can be seen more specifically in FIGS. 1, 2 and 3, the locking device 1 further comprises, on the other side of the tilting washer 5, second locking means 22 which are symmetric with the locking means 12 with respect to the radial axis 11.

These locking means 22 thus comprise a locking washer 23 arranged around the inner element 2 and in an internal housing 24 of the outer element 4. This housing has a narrowing 25 which determines two longitudinally opposed supports 26 and 27 situated more or less in longitudinal alignment with the spring 18 and the spacer rod 20 of the first locking means 12. The locking means 22 also comprise a compression spring 28 arranged in a blind longitudinal hole 29 of the outer element 4 and acting on the washer 23 toward the tilting washer 5. The locking means 22 also comprise a longitudinal spacer rod 30 sliding in a longitudinal passage 31 of the outer element 4, opening on the one hand, into the housing 6 and on the other hand, into the housing 24, this spacer rod 30 resting, on the one hand against the opposite face 5b of the tilting washer 5 and on the other hand on the locking washer 23. The spring 28 and the spacer rod 30 are more or less in longitudinal alignment with the supports 16 and 17 of the locking means 12.

The locking device 1 further comprises a longitudinal operating rod 32 arranged in a longitudinal passage 33 of the outer element 4 which passes some distance from the narrowed part 25 of the housing 24 and the end 32a of which comes to rest against the face 5b of the tilting washer 5, opposite the spacer rod 20.

In the example described, the outer element 4 comprises two parts 4a and 4b which between them have a longitudinal plane of contact 4c which runs at right angles to the radial axis 11. These two parts 4a and 4b of the outer element 4 are joined together by any known means, not depicted, such as screws or by some other means.

Thus, the two parts 4a and 4b of the outer element 4 are symmetric with respect to the longitudinal plane containing the longitudinal contact surface 4c so that the passage 3 accommodating the inner element 2, the housings 6, 14 and 24 accommodating the washers 5, 13 and 23, the blind holes 19 and 29 accommodating the springs 18 and 28 and the passages 21, 31 and 33 accommodating the rods 20, 30 and 32 are formed half in each of the parts 4a and 4b symmetrically with respect to the plane of contact 4c.

The locking device 1 works as follows.

When the operating rod 32 is not subjected to any force, the springs 18 and 28 incline the locking washers 13 and 23 toward the tilting washer 5 until they are brought into an extreme inclined position in which they come into contact with the inner element 2 at two diametrically opposed regions situated one on the same side as the narrowed parts 15 and 27 and the other on the same side as the springs 18 and 28. As the locking washers 13 and 23 are locked longitudinally in narrowed parts 15 and 25, they longitudinally, each in one direction, lock the inner element 2 with respect to the outer element 4, which thus finds itself longitudinally locked in both directions through a wedging effect.

By acting longitudinally on the operating rod 32 toward the tilting washer 5, this tilting washer 5 can then be made to pivot around the radial axis 11. This tilting movement is then transmitted to the locking washers 13 and 23 via the spacer rods 20 and 30 so as to move them away from their extreme inclined locking position by reducing their inclination against the action of springs 18 and 28.

These unlocking movements release the inner element 2 with respect to the outer element 4 which can then be slid one with respect to the other. When they have reached a given relative longitudinal position, the operating rod 32 is released. The springs 18 and 28 then push the washers 13 and 23 back to bring them back into their locking position described previously, at the same time pushing back the spacer rods 20 and 30 and causing the tilting washer 5 to tilt, this washer itself pushing back the operating rod 32.

With reference to FIGS. 7 and 8, it can be seen that there is depicted an alternative form of embodiment of the locking device 1 which differs therefrom in that the operating rod 32 is omitted and in that the tilting washer 5 has a lateral appendage 34 which extends through a passage 35 that passes through the wall of the outer element 4 and opens into the housing 6. By acting manually on this appendage 34 from outside and longitudinally, it is then possible to cause the tilting washer 5 to tilt as previously in such a way as to act on the washers 13 and 23 in the direction of unlocking them.

With reference to FIG. 9, it can be seen that there is depicted an example of an application of the connecting device 1 to a pole 36 for example a ski pole or walking pole, of variable length, the inner element 2 of which constitutes its lower part and the outer element 4 of which constitutes its upper part. The upper part of the pole 26 has, at the opposite end to the inner element 2, a hand grip 37, the operating rod 32 opening into the upper part of this hand grip 37 and bearing a button 38 for pressing downward to act on the locking device 1 for example provided in the lower part of the outer element 4.

What is claimed is:

1. A device for locking two elongate elements, a first of which slides in a second telescopically, the device comprising means (12) for locking the first element (2) in a first longitudinal direction with respect to the second element (4), which means comprise a locking washer (13) arranged around the first element and a circumferential part of which is placed between two longitudinally opposed supports of said second element and an elastic return member (18) placed between said second element and said washer and acting in said longitudinal direction on the washer at a point distant from said supports so as to bring the washer into an extreme inclined position with respect to the first element, in which position two opposed parts of this washer are in contact with the first element so as to lock the first element (2) with respect to the second element (4) in said longitudinal direction, and a tilting member (5) articulated to said second element, a spacing member (20) placed between the washer and the tilting member and an operating member (32) allowing action on the tilting member so that action on this operating member causes the tilting member to tilt, which tilting member, via the spacing member acts on the washer in such a way as to move it away from its aforementioned extreme position against the action of said return means, reducing its inclination, so as to release the first element with respect to the second element.

2. The device as claimed in claim 1, further comprising a second means (22) for locking the first element in the other longitudinal direction with respect to the second element, which means comprise a second washer arranged around the first element and a circumferential part of which is placed between two second longitudinally opposed supports of said second element and a second elastic return member placed between said second element and said second washer and acting in said other longitudinal direction on the second washer at a point distant from said second supports so as to bring the second washer into an extreme inclined position with respect to the first element, in which position two opposed parts of this second washer are in contact with the first element so as to lock the first element with respect to the second element in said other longitudinal direction, and a second spacer member placed between the second washer and said tilting member so that the aforementioned action on this operating member acts also, via the second spacer member, on the second washer so as to move it away from its aforementioned extreme position against the action of said second return member, reducing its inclination, so as to release the first element with respect to the second element.

3. The device as claimed in claim 2, characterized in that said first (12) and second (22) locking means are arranged on each side of said tilting member (5), said tilting member acting in opposite directions on said spacer members (20, 30).

4. The device as claimed in claim 1, characterized in that said tilting member comprises a washer (5) which from a distance surrounds said first element and which is mounted in an articulated fashion on the second element, radially relative to the latter.

5. The device as claimed in claim 1, characterized in that said washers (5, 13, 23) are arranged in internal annular housings (6, 14, 24) of the second element.

6. The device as claimed in claim 1, characterized in that said spacer members comprise rods (20, 30) that can move longitudinally in passages of the second element.

7. The device as claimed in claim 1, characterized in that said operating member comprises a rod (32) that can move longitudinally in a passage of the second element.

8. The device as claimed in claim 1, characterized in that said operating member comprises an extension (34) of said tilting member (5), which extends through the wall of said second element.

9. The device as claimed in claim 1, characterized in that the second element (4) comprises two assembled parts (4a, 4b) the mutual plane of contact of which extends along a longitudinal plane (33) passing through the axis of said elements, in that said return members, said spacer members and said operating member are arranged between said assembled parts of the second element, and in that said tilting member (5) is articulated to the second element about an axis (11) perpendicular to said plane of contact (4c).

* * * * *